(12) United States Patent
Matuschka

(10) Patent No.: US 11,408,384 B2
(45) Date of Patent: Aug. 9, 2022

(54) ELECTRONICALLY CONTROLLED FUEL INJECTOR

(71) Applicant: ZAMA JAPAN CO. LTD., Iwate (JP)

(72) Inventor: Boris Matuschka, Stuttgart (DE)

(73) Assignee: ZAMA JAPAN KABUSHIKI KAISHA, Iwate (JP)

( * ) Notice: Subject to any disclaimer, the term of this patent is extended or adjusted under 35 U.S.C. 154(b) by 0 days.

(21) Appl. No.: 17/235,529

(22) Filed: Apr. 20, 2021

(65) Prior Publication Data

US 2021/0324822 A1   Oct. 21, 2021

(51) Int. Cl.
*F02M 61/04*  (2006.01)
*F02M 51/06*  (2006.01)
*B60K 15/03*  (2006.01)

(52) U.S. Cl.
CPC ........ *F02M 51/0614* (2013.01); *F02M 61/04* (2013.01); *B60K 15/03* (2013.01); *F02M 2200/16* (2013.01); *F02M 2200/9015* (2013.01)

(58) Field of Classification Search
CPC .... F02M 51/0614; F02M 51/04; F02M 61/04; F02M 57/027; F02M 59/464; F02M 2200/9015; F02M 2200/16; B60K 15/03
USPC ................ 123/456, 457, 467, 490, 510, 511
See application file for complete search history.

(56) References Cited

FOREIGN PATENT DOCUMENTS

| JP | 2008-163875 | 7/2008 | |
|---|---|---|---|
| WO | WO 2007/111230 A1 | 10/2007 | |
| WO | WO-2009098112 A1 * | 8/2009 | ............. F02M 37/20 |

* cited by examiner

*Primary Examiner* — Hai H Huynh
(74) *Attorney, Agent, or Firm* — One LLP

(57) ABSTRACT

Disclosed are example embodiments of a fuel injection device having a plunger that moves at a predetermined reciprocating motion from an initial position, the fuel injection device includes: an electromagnetic coil; a tubular bobbin within the electromagnetic coil, wherein the electromagnetic coil is configured to move the tubular bobbin when energized; a fuel intake channel; and an inlet check valve disposed along a fuel pathway of the fuel intake channel, the inlet check valve configured to allow fuel to flow through and to a pressurization chamber, wherein the inlet check valve is a normally open valve.

16 Claims, 5 Drawing Sheets

ELECTRONICALLY CONTROLLED FUEL INJECTOR

CROSS-REFERENCE TO RELATED APPLICATIONS

The subject application claims the benefit of Japanese Patent Application No. 2020-75706, filed Apr. 21, 2020, which application is incorporated herein by reference in its entirety.

TECHNICAL FIELD

The disclosure relates generally to the field of fuel injection devices. Specifically, and not by way of limitation, the disclosure relates to electronic fuel injection devices that inject fuel using a reciprocating plunger.

BACKGROUND

Conventional electronically controlled fuel injection devices are designed to inject fuel from an injection nozzle into an air intake of an engine by pumping fuel from a fuel tank, which is arranged at a lower position than the position of the intake pipe (for a gravity assisted pump).

The fuel is pumped by the pumping action of an electromagnetically driven plunger and burned from the injection nozzle. This fuel injection process also generates excess fuel and inflowing air bubbles. The excess fuel (hereinafter referred to as "vapor") is returned to the fuel tank through a return pipe. An example of the above fuel injection device is presented in Japanese Patent Application Laid-Open No. 2008-163875, which is used in engines such as motorcycles.

FIG. 1 illustrates a conventional electronically controlled fuel injection device 100 being integrated with an amateur 1. In fuel injection device 100, plunger 2 is excited by an electromagnetic coil 3 to generate a reciprocating motion, which moves plunger 2 by a predetermined amount from a standby position. The electromagnetic force drives plunger 2, and a return spring 21 returns the plunger 2 to its original position. This essentially creates the reciprocating motion.

Fuel is supplied to pressurization chamber 5 (where it is pressurized) from fuel intake channel 4, which is connected to the charge tank (not shown). The fuel is injected from the injection nozzle 6 that is provided downstream from the intake port (not shown) of the engine. This configuration is advantageous in that it can be provided at low cost because it does not require a fuel pump or pressure regulator.

Since plunger 2 of fuel injection device 100 is driven by electromagnetic coil 3, the fuel pump and fuel injection valve can be integrated. Pressure loss in the fuel intake channel 4 can occur when fuel is supplied to the pressurization chamber 5 via the inlet check valve 11, which in turn can generate fuel vapor. The fuel vapor is then discharged through the passage from the pressurization chamber 5 to the valve 13.

The outside of inner yoke 7, that surrounds the amateur 1, includes a taper to provide a natural flow passage for the vapor. Electromagnetic coil 3 is wounded on the outer circumference of inner wall surface 81 of the bobbin 8. Some of the fuel supplied to pressurized chamber 5 is returned to the fuel tank (not shown) via return passage 9.

In an electronically controlled fuel injection device, fuel is pressurized by the driving force of plunger 2. As such, the passage from the pressurization chamber 5 to the valve 13 covers the entire driving distance of the plunger 2. However, the passage connecting chamber 5 and valve 13 must be sealed when plunger 2 is driven downward. This leaves very little for the vapor to discharge.

Another conventional electronically controlled fuel injection device is also described in, for example, Japanese Patent Application Laid-Open No. 2007-263016. In one such conventional fuel injection device, fuel is pressurized by the reciprocating motion of the piston through the fuel intake line 4. Inlet check valve 11 is used for the purpose of sealing pressurization chamber 5 in order to pressurize the fuel. Once installed, inlet check valve 11 closes valve body 111 in the valve closing direction. Spring member 112 is a normally closed type spring in which the spring member 112 is arranged to bias in a direction opposite to the flow of fuel. In other words, spring member 112 is arranged such that check valve 11 is normally closed. In this configuration, there is a large pressure drop each time the check valve 11 is actuated. This causes fuel vapor to be generated. Accordingly, what is needed is an improved fuel injector design to minimize the generation of fuel vapor.

SUMMARY

One of the objectives of the present disclosure is to provide an electronically controlled fuel injection device that solves the problems described above by: reducing and/or eliminating the generated fuel vapor and pressure loss. The disclosed fuel injection device includes an inlet check valve between the fuel supply pipe and the pressurization chamber. The inlet check valve is configured to reduce the generation of vapor due to output and thereby reducing the number of parts and cost due to the simplified structure. This can be done by using a normally open type valve as the inlet check valve. Additionally, the inlet check valve is configured to open and close in a linear direction that is parallel to the flow of the fuel from the intake channel to the pressurization chamber.

The embodiment disclosed herein is an improved electronically controlled fuel injector (hereinafter simply "the fuel injector") that includes a plunger (e.g., tubular bobbin) configured to translate via a reciprocating motion from a standby position to a predetermined position. The fuel injector also includes an electromagnetic coil arranged on the outer circumference of the plunger, which is reciprocated by exciting with an electromagnetic coil wounded around the outer wall surface of the bobbin.

The injection nozzle of the fuel injector is configured to supply pressurized fuel from the fuel intake pipeline to pressurization chamber. Fuel is injected into the engine from the fuel intake channel. A regularly open inlet check valve is arranged to seal the pressurization chamber when fuel is sucked into pressurization chamber and pressurized.

Further, in the present disclosure, the inlet check valve is configured to open or close in response to a pressure change in the pressurization chamber. Additionally, some fuel is returned to the fuel tank via an outlet valve coupled to the pressurization chamber. When the pressurization chamber and the intake channel are parallelly connected, it is possible to promote the discharge of the generated vapor more reliably.

The disclosed (improved) fuel injector can also include an inlet check valve between the fuel supply pipe and the pressurization chamber. This makes it possible to reduce the generation of vapor due by reducing pressure loss. In addition, the number of parts in the fuel injector can be reduced and the structure simplified. This reduces cost by simplifying the construction.

One of the disclosed fuel injection devices includes: an electromagnetic coil; a tubular bobbin within the electromagnetic coil, wherein the electromagnetic coil is configured to move the tubular bobbin when energized; a fuel intake channel; and an inlet check valve disposed along a fuel pathway of the fuel intake channel, the inlet check valve configured to allow fuel to flow through and to a pressurization chamber, wherein the inlet check valve is a normally open valve.

The inlet check valve is configured to open or close based on pressure inside the pressurized chamber. For example, the inlet check valve is configured to close when the pressure inside the pressurized chamber is pressurized by the tubular bobbin moving toward the pressurization chamber.

The inlet check valve can have a spherical-shaped head configured to mate with a conical port coupled to the fuel intake channel and prevent fuel from flowing to the pressurization chamber.

The inlet check valve can have a spring member configured to hold the check valve in a normally open position. The spring member can be concentrically disposed with respect to the fuel intake channel. The spring member is configured to open or close the inlet check valve in a linear motion that is parallel to a main axis of the fuel intake channel.

The inlet check valve can also include an annular ring configured to mate with a communication port coupled to the fuel intake channel. The annular ring is configured to seal the communication port and prevent fuel from flowing to the pressurization chamber when it is mated with the communication port.

In another example embodiment, a fuel injector includes: a pressurization chamber; a fuel intake channel; and an inlet check valve having a communication port fluidically coupled to the fuel intake channel and one or more outlets fluidically coupled to the pressurization chamber, wherein the communication port is disposed along a longitudinal axis of the fuel intake chamber such that fuel can flow from the fuel intake channel to the pressurization chamber in a substantially linear direction.

BRIEF DESCRIPTION OF THE DRAWINGS

The foregoing summary, as well as the following detailed description, is better understood when read in conjunction with the accompanying drawings. The accompanying drawings, which are incorporated herein and form part of the specification, illustrate a plurality of embodiments and, together with the description, further serve to explain the principles involved and to enable a person skilled in the relevant art(s) to make and use the disclosed technologies.

The figures and the following description describe certain embodiments by way of illustration only. One skilled in the art will readily recognize from the following description that alternative embodiments of the structures and methods illustrated herein may be employed without departing from the principles described herein. Reference will now be made in detail to several embodiments, examples of which are illustrated in the accompanying figures. It is noted that wherever practicable similar or like reference numbers may be used in the figures to indicate similar or like functionality.

DETAILED DESCRIPTION

Overview

Figure 1:
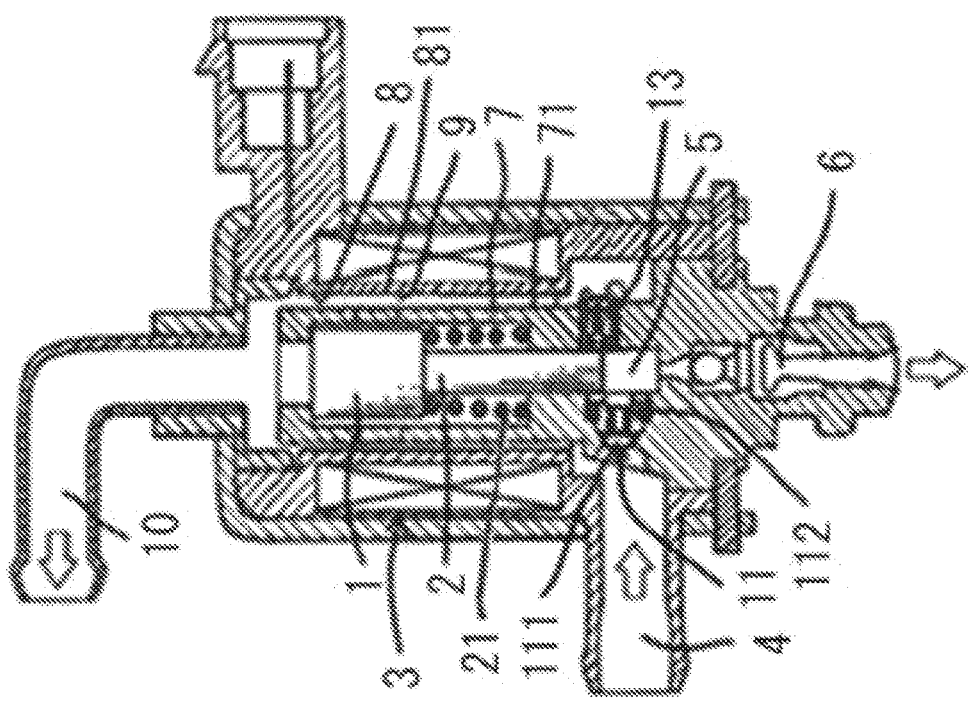
FIG. 1 illustrates a conventional fuel injection device.
Figure 2:
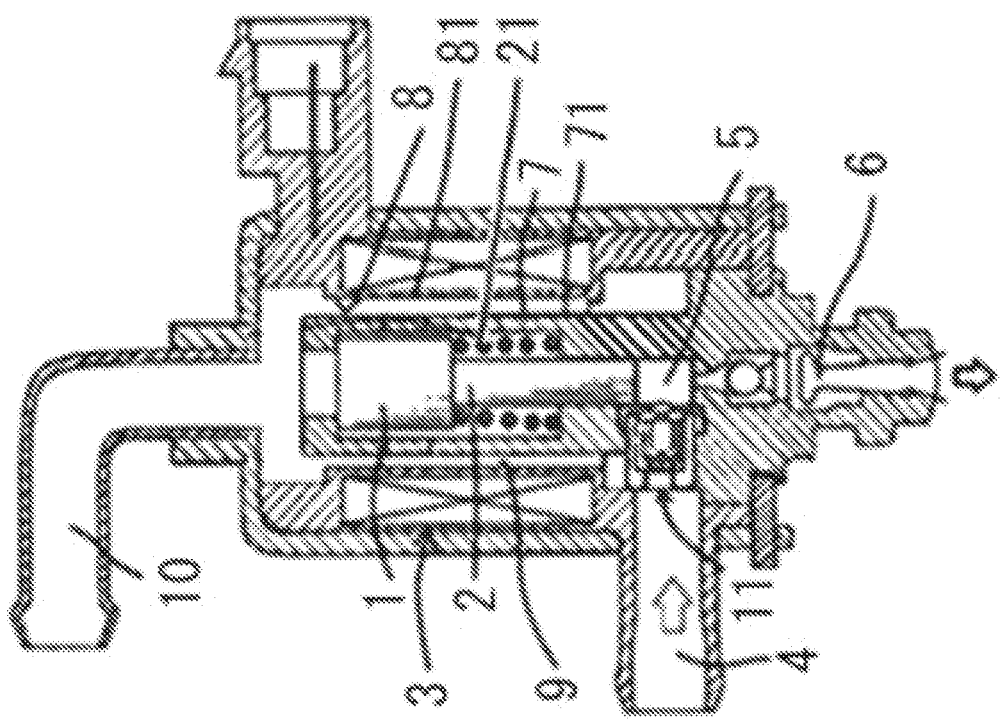
FIG. 2 illustrates a fuel injection device in accordance with some embodiments of the present disclosure.
Figure 3:
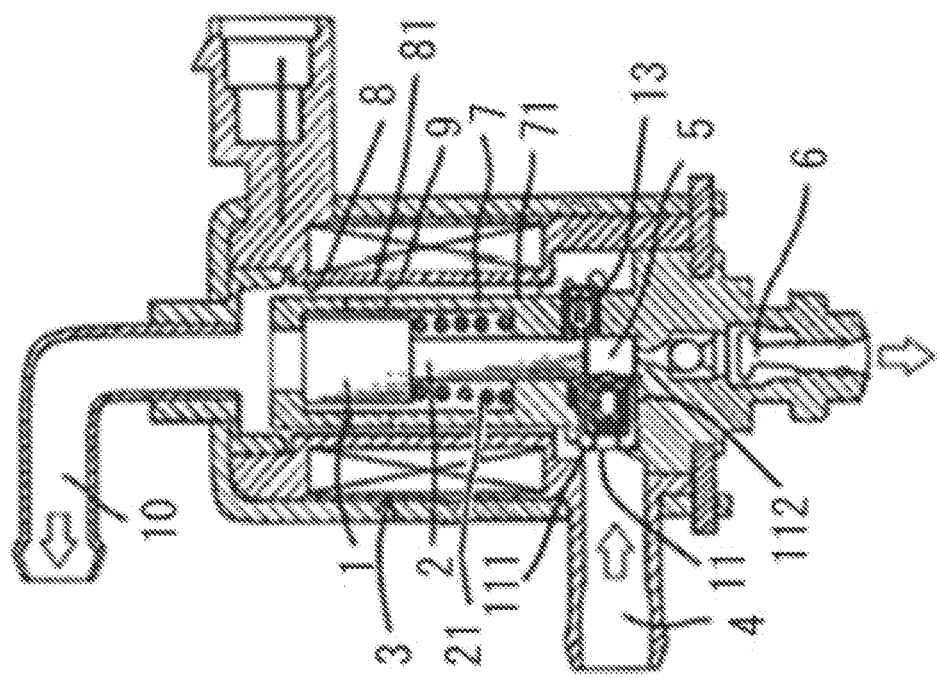
FIG. 3 illustrates a fuel injection device in accordance with some embodiments of the present disclosure.

FIGS. 2 and 3 illustrate a vertical cross sectional view of an electronically controlled fuel injection device 200 in accordance with some embodiments of the present disclosure. Although fuel injection device 200 shares similar components as those of the conventional fuel injection device shown in FIG. 1 and that these components may have the same reference number, these reference numbers are only to aid the understanding and description of injection device 200. It should be noted that one or more components of injection device 200 can be different in one or more ways (e.g., mechanically, functionally) from components of the fuel injection device 100 having the same reference numbers. For example, inlet check valve 11 of fuel injection device 200 can be structurally and/or functionally different than inlet check valve 11 of the conventional injection device 100 shown in FIG. 1.

In fuel injection device 200, fuel is supplied to pressurization chamber 5 to be pressurized. In some embodiments, the fuel can be pre-pressurized when it is supplied to pressurization chamber 5. Inlet check valve 11 is configured to seal pressurization chamber 5 and is disposed within valve body 111, which is arranged in the valve opening direction. Stated differently, inlet check valve 11 is disposed such that it is in the same direction in which fuel flows. Inlet check valve 11 includes spring member 112 having a predetermined strength (e.g., k-value) that is biased in the open valve direction. In this way, the valve is a regularly open type valve.

Figure 4:
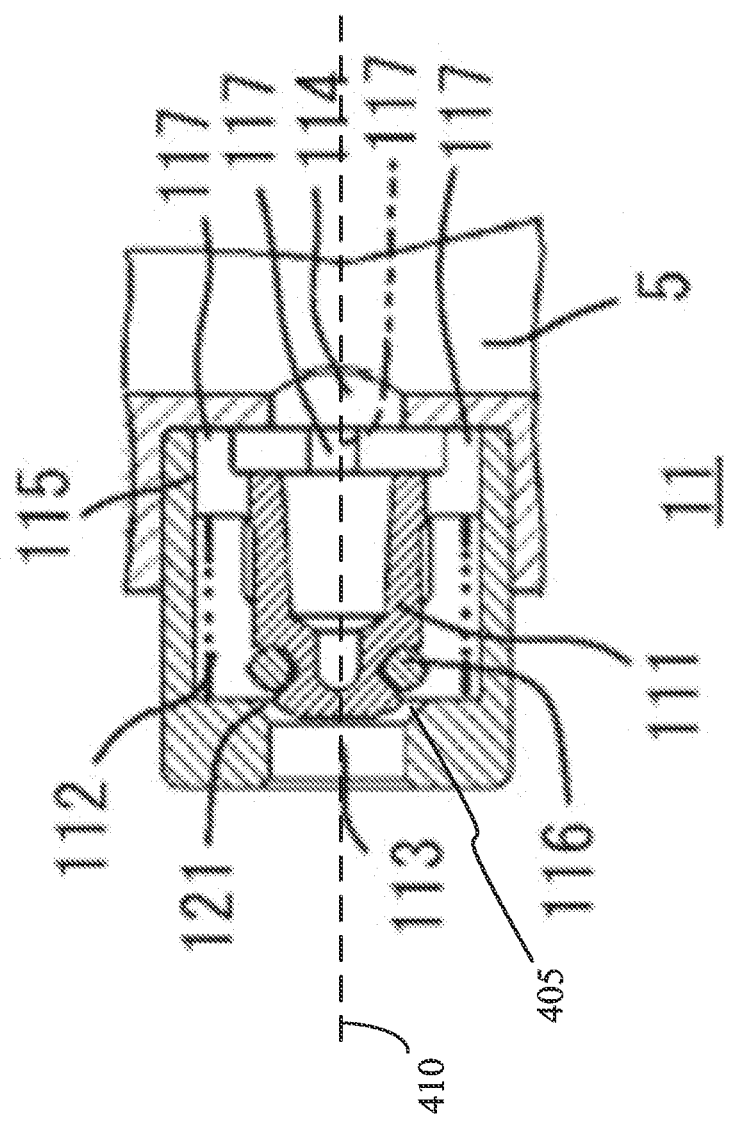
FIG. 4 illustrates an inlet check valve in accordance with some embodiments of the present disclosure.

FIG. 4 illustrates an enlarged view of inlet check valve 11 of fuel injection device 200 in accordance with some embodiments of the present disclosure. Check valve 11 includes an annular valve seat 121 at connection port (e.g., inlet port) 113, which is in fluid communication with intake channel 4 and the open end inside connection port 113. Check valve 11 includes connection port 114 that is in fluid communication with pressure chamber 5. Connection port 113 and connection port 114 are on the opposite ends of check valve 11. Connection port 113 is at the upstream end and connection port 114 is at the downstream end. Tubular (e.g., cylindrical) valve case 115 includes a recess portion having a certain depth along the axial direction of valve case 115 such that check valve 11 can be fitted therein. The connection port 113 (e.g., inlet port) of the check valve 11 is an opening that interfaces with intake channel 4. To close inlet check valve 11 to stop fuel from flowing to pressurization channel 5, the connection port 113 must be closed.

In some embodiments, valve body 111 can be movably attached to valve case 115. Spring member 112 (e.g., biasing member) is configured to bias valve body 111 such that connection port 113 is open to intake channel 4. Spring member 112 can be a spring or other type of force biasing member. In some embodiments, spring member 112 is placed within valve case 115 such that it pushes valve body 111 toward pressurization chamber 5. Spring member 112 can also be configured to hold valve case 115 in a predetermined open position. Further, in some embodiments, the valve body 111 has the valve case 115 on the proximal end side.

Valve body 111 can be formed with, for example, rubber or a synthetic resin material with elasticity. In this way, a portion of valve body 111 and/or annular ring 116 can make a tight and sealed contact with valve seat 121. When the valve is open, fuel from fuel intake channel 4 flows through gap 405 between annular ring 116 and valve seat 121. As shown, annular ring 116 can be attached to valve body 111. Ring 116 can also be made of rubber, elastic resin, or other compliant and durable material.

In some embodiments, check valve 11 includes four outlets 117. Two or more of outlets 117 can be arranged at right angles to each other. In other words, fuel can enter chamber 5 at different angles as one outlet can be perpendicular to another outlet.

Valve body 111 is placed in a predetermined open position in valve case 115 along the supply fuel pressure. Stated differently, valve body 111 is placed within valve case 115 such that the direction of fuel flow is substantially parallel to the fuel intake channel 4. In this way, fuel can flow directly from fuel intake channel 4 into the pressurization chamber 5 with the least amount of resistance and/or turns from extra components and/or travel distance. As mentioned, check valve 11 is a normally open-type valve, which is biased to an open position by a biasing member (e.g., spring). Inlet check valve 11 can adjust the amount of fuel entering the valve by adjusting the position of valve body 111 along longitudinal axis 410.

It should be noted that the open and close motion of inlet check valve 11 is a linear motion that is substantially parallel to the flow of the fuel from in-take channel 4 to chamber 5. In other words, the open-close motion of inlet check valve 11 is substantially parallel to the longitudinal axis of in-take channel (e.g., pipe) 4.

Figure 5:
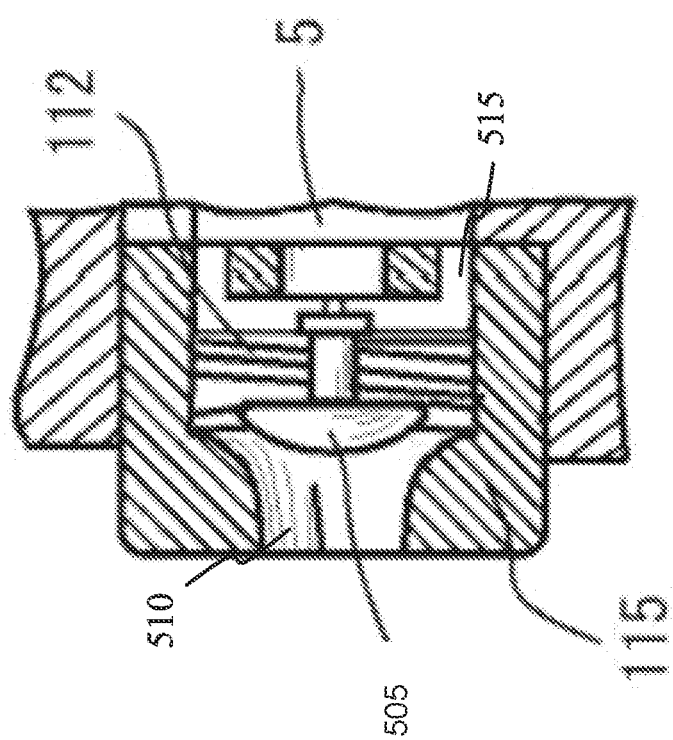
FIG. 5 illustrates an inlet check valve in accordance with some embodiments of the present disclosure.

FIG. 5 illustrates an inlet check valve 500 in accordance with some embodiments of the present invention. Check valve 500 can have one or more features of check valve 11 shown in FIG. 4. As shown, check valve 500 includes a valve head 505 and conical-shaped connection port 510. Valve head 505 can be partially spherical in shape. Valve head 505 is shaped such that it fits tightly against the inner wall of conical port 510. In some embodiments, valve head 505 can be made of a compliant material such as rubber or other high heat-resistant and compliant materials.

Referring to FIG. 3, plunger 2 is urged upward by return spring 21 when plunger 2 is not excited by electromagnetic coil 3. During operation, fuel vapor can be generated when fuel is pushed to chamber 5 via check valve 11. When this occurs, the vapor can be discharged to the fuel tank (not shown). Spring member 112 can be disposed around valve head 505 such that it pushes against valve portion 515 on which valve head 505 is attached. In this way, spring member 112 can keep conical port 510 open. In operation, check valve 11 would close when the pressure inside chamber 5 increases due to the downward motion of plunger 2.

When electromagnetic coil 3 is excited, plunger 2 moves downward against return spring 21 toward pressurization chamber 5. This also causes inlet check valve 11 to close and the fuel inside pressurization chamber 5 to pressurize. The compressed fuel is then injected from the injection nozzle 6, which is located downstream, to the intake port (not shown) of the engine.

When electromagnetic coil 3 is off (no excitation), plunger 2 is moved upward away from chamber 5 by return spring 21. The cycle then repeats as fuel flows from intake channel 4 to pressurization chamber 5 via inlet check valve 11. If any vapor is present, it is ejected to return passage 9.

As described above, the discharge of fuel vapor by fuel injection device 200 is unlike a conventional fuel injector where fuel is only discharged when fuel is pushed into pressurization chamber 5. With fuel injector 200, fuel vapor can be discharged at any cycle except when the plunger is driven downward to pressurize the fuel.

In some embodiments, fuel injection device 200 includes return passage 9 and valve 13, which is configured to adjust the amount of fuel and/or fuel vapor to be discharged. Further, in fuel injection device 200, inlet check valve 11 is a normally open type, which is configured to open and close according to the change in pressure. In conventional fuel injectors, the inlet check valve is a normally closed valve, which causes a pressure loss and fuel is supplied to pressurization chamber 5 from fuel intake channel 4. By using a normally open check valve with its longitudinal axis being substantially parallel to the main axis of intake channel 4, pressure loss can be substantially reduced if not eliminated while fuel is supplied to pressurization chamber 5.

Fuel injection device 200 also includes a valve 13 configured to expel fuel vapor from pressurization chamber 5 via return passage 9. Fuel injection device 200 can be manufactured with less parts than conventional fuel injection devices. This simplifies the structure and reduces the manufacturing cost.

CONCLUSION

The foregoing description of the embodiments of the present invention has been presented for the purposes of illustration and description. It is not intended to be exhaustive or to limit the present invention to the precise form disclosed. Many modifications and variations are possible in light of the above teaching. It is intended that the scope of the present invention be limited not by this detailed description, but rather by the claims of this application. As will be understood by those familiar with the art, the present invention may be embodied in other specific forms without departing from the spirit or essential characteristics thereof. Likewise, the particular naming and division of the modules, routines, features, attributes, methodologies and other aspects are not mandatory or significant, and the mechanisms that implement the present invention or its features may have different names, divisions and/or formats.

Furthermore, as will be apparent to one of ordinary skill in the relevant art, the modules, routines, features, attributes, methodologies and other aspects of the present invention can be implemented as software, hardware, firmware or any combination of the three. Also, wherever a component, an example of which is a module, of the present invention is implemented as software, the component can be implemented as a standalone program, as part of a larger program, as a plurality of separate programs, as a statically or dynamically linked library, as a kernel loadable module, as a device driver, and/or in every and any other way known now or in the future to those of ordinary skill in the art of computer programming.

Additionally, the present invention is in no way limited to implementation in any specific programming language, or for any specific operating system or environment. Accordingly, the disclosure of the present invention is intended to be illustrative, but not limiting, of the scope of the present invention, which is set forth in the following claims.

The invention claimed is:

1. A fuel injection device with a plunger that moves at a predetermined reciprocating motion from an initial position, the fuel injection device comprising:

an electromagnetic coil;
a tubular bobbin within the electromagnetic coil, wherein the electromagnetic coil is configured to move the tubular bobbin when energized;
a fuel intake channel; and
an inlet check valve disposed along a fuel pathway of the fuel intake channel, the inlet check valve configured to allow fuel to flow through and to a pressurization chamber, wherein the inlet check valve is a normally open valve.

2. The fuel injection device of claim 1, wherein the inlet check valve is configured to open or close based on pressure inside the pressurized chamber.

3. The fuel injection device of claim 2, wherein the inlet check valve is configured to close when the pressure inside the pressurized chamber is pressurized by the tubular bobbin moving toward the pressurization chamber.

4. The fuel injection device of claim 1, wherein the inlet check valve comprises a spherical-shaped head configured to mate with a conical port coupled to the fuel intake channel and prevent fuel from flowing to the pressurization chamber.

5. The fuel injection device of claim 1, wherein the inlet check valve comprises a spring member configured to hold the check valve in a normally open position, wherein the spring is concentrically disposed with respect to the fuel intake channel.

6. The fuel injection device of claim 5, the spring member is configured to open or close the inlet check valve in a linear motion that is parallel to a main axis of the fuel intake channel.

7. The fuel injection device of claim 1, further comprising a return pipe connected a fuel tank via and an outlet valve that is connected to the pressurization chamber.

8. The fuel injection device of claim 1, wherein the inlet check valve comprises an annular ring configured to mate with a communication port coupled to the fuel intake channel, wherein the annular ring is configured to seal the communication port to prevent fuel from flowing to the pressurization chamber.

9. The fuel injection device of claim 8, wherein the annular ring comprises rubber or an elastic polymer.

10. A fuel injector comprising:
a pressurization chamber;
a fuel intake channel; and
an inlet check valve having a communication port fluidically coupled to the fuel intake channel and one or more outlets fluidically coupled to the pressurization chamber, wherein the communication port is disposed along a longitudinal axis of the fuel intake chamber such that fuel can flow from the fuel intake channel to the pressurization chamber in a substantially linear direction.

11. The fuel injector of claim 10, wherein the inlet check valve comprises a normally open valve.

12. The fuel injector of claim 10, wherein the inlet check valve is configured to close when the pressure inside the pressurized chamber is pressurized by a plunger of the fuel injector moving toward the pressurization chamber.

13. The fuel injector of claim 10, wherein the inlet check valve comprises a spherical-shaped head configured to mate with the communication port to prevent fuel from flowing to the pressurization chamber.

14. The fuel injector of claim 10, wherein the inlet check valve comprises a spring member configured to hold the check valve in a normally open position, wherein the spring is concentrically disposed with respect to the fuel intake channel.

15. The fuel injector of claim 14, the spring member is configured to open or close the inlet check valve in a linear motion that is parallel to a main axis of the fuel intake channel.

16. The fuel injector of claim 10, wherein the inlet check valve comprises an annular ring configured to mate with the communication port, wherein the annular ring is configured to seal the communication port to prevent fuel from flowing to the pressurization chamber.

\* \* \* \* \*